(12) United States Patent
Medina, III et al.

(10) Patent No.: US 9,953,231 B1
(45) Date of Patent: Apr. 24, 2018

(54) AUTHENTICATION BASED ON HEARTBEAT DETECTION AND FACIAL RECOGNITION IN VIDEO DATA

(71) Applicant: United Services Automobile Association (USAA), San Antonio, TX (US)

(72) Inventors: Reynaldo Medina, III, San Antonio, TX (US); Carlos Chavez, San Antonio, TX (US); Nandhini Sridaran, Boerne, TX (US); Russell Colwell, San Antonio, TX (US); Yuesheng Liu, Helotes, TX (US); Storme Shelton Briscoe, Tucson, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/354,529

(22) Filed: Nov. 17, 2016

Related U.S. Application Data

(60) Provisional application No. 62/256,220, filed on Nov. 17, 2015.

(51) Int. Cl.
| | | |
|---|---|---|
| *G06K 9/00* | (2006.01) | |
| *G10L 17/00* | (2013.01) | |
| *G06F 21/32* | (2013.01) | |

(52) U.S. Cl.
CPC ......... *G06K 9/00892* (2013.01); *G06F 21/32* (2013.01); *G06K 9/00302* (2013.01);
(Continued)

(58) Field of Classification Search
CPC .......... G06K 2009/00939; G06K 2009/00892; G06K 2009/00221; G06K 2009/00302; G06K 2009/00308; G06K 2009/00315
See application file for complete search history.

(56) References Cited

U.S. PATENT DOCUMENTS

| | | | | |
|---|---|---|---|---|
| 6,993,378 B2 * | 1/2006 | Wiederhold | ....... | A61B 5/02055 382/115 |
| 8,902,045 B1 * | 12/2014 | Linn | ....... | G06F 21/32 340/5.53 |

(Continued)

OTHER PUBLICATIONS

Haque, et al. Heartbeat Signal from Facial Video for Biometric Recognition, 19th Scandinavian Conference on Image Analysis (SCIA), Springer, 2015, 12 pages.

*Primary Examiner* — Wesley J Tucker
(74) *Attorney, Agent, or Firm* — Fish & Richardson P.C.

(57) ABSTRACT

Techniques are described for authenticating a user to access information through an application executing on a computing device. Multiple authentication methods may be used in combination to authenticate the user with greater confidence than authentication provided by a single method, and to verify that the user is a live person and not an image or video. Facial recognition may be used in conjunction with heartbeat detection, via video analysis, to verify the user's identity and confirm that the user is live. Facial recognition may include capturing an image of the user's face and comparing certain points on the face with previously gathered information regarding the user. Heartbeat detection may include capturing a video segment of the user, stabilizing the captured video data, applying motion magnification techniques to the stabilized video data, and analyzing the stabilized, magnified video data to determine a presence of the user's heartbeat.

17 Claims, 10 Drawing Sheets

(52) U.S. Cl.
CPC ...... *G06K 9/00617* (2013.01); *G06K 9/00711* (2013.01); *G10L 17/005* (2013.01); *G06K 2009/00939* (2013.01)

(56) References Cited

U.S. PATENT DOCUMENTS

| | | | | |
|---|---|---|---|---|
| 2010/0328034 | A1* | 12/2010 | Medina | A61B 5/14551 340/5.83 |
| 2012/0016827 | A1* | 1/2012 | Evans | G06F 21/32 706/14 |
| 2013/0079649 | A1* | 3/2013 | Mestha | A61B 5/0022 600/508 |
| 2013/0282589 | A1* | 10/2013 | Shoup | G06F 21/34 705/67 |
| 2014/0121540 | A1* | 5/2014 | Raskin | A61B 5/6898 600/479 |
| 2016/0042648 | A1* | 2/2016 | Kothuri | G06F 3/015 434/236 |
| 2016/0191822 | A1* | 6/2016 | Kosugou | H04N 5/23219 382/118 |

\* cited by examiner

AUTHENTICATION BASED ON HEARTBEAT DETECTION AND FACIAL RECOGNITION IN VIDEO DATA

CROSS-REFERENCE TO RELATED APPLICATION

The present disclosure is related to, and claims priority to, U.S. Provisional Patent Application Ser. No. 62/256,220, filed on Nov. 17, 2015, titled "Authentication Based on Heartbeat Detection and Facial Recognition in Video Data," the entirety of which is hereby incorporated by reference into the present disclosure.

BACKGROUND

Service providers may provide applications that enable their users to access information or request actions regarding user accounts. Such applications may include authentication features to ensure that a user is authorized to access information or request actions through the application. Traditional methods for authenticating a user may be insecure given the strong incentive for malicious individuals to attempt unauthorized access to accounts, in an effort to view confidential information, access financial data, request unauthorized funds transfers, or perform other actions.

SUMMARY

Implementations of the present disclosure are generally directed to authenticating a user based on multiple authentication methods, including authentication methods that employ biometric data of the user. More particularly, implementations of the present disclosure are directed to user authentication based on facial recognition in combination with video data analysis to detect a heartbeat or pulse of the user.

In general, innovative aspects of the subject matter described in this specification can be embodied in methods that include actions of receiving video data of a user, the video data collected in response to detecting an attempt to access information through an application executing on a user device, the video data generated by a video capture component of a user device, comparing at least one frame of the video data to a previously collected image of the user, analyzing the video data to detect a heartbeat of the user, and providing access to the information through the application based at least partly on: detecting the heartbeat of the user, and determining that the at least one frame of the video data corresponds to the previously collected image of the user. Other implementations of this aspect include corresponding systems, apparatus, and computer programs that are configured to perform the actions of the methods, encoded on computer storage devices.

These and other implementations can each optionally include one or more of the following features: analyzing the video data to detect the heartbeat further includes: performing motion stabilization on the video data and magnifying the video data; the actions further including providing access to high-risk information through the application based at least partly on: detecting the heartbeat of the user based on the analyzing of the video data, and determining that the at least one frame of the video data corresponds to the previously collected image of the user; the actions further including providing access to low-risk information through the application based at least partly on: failing to detect the heartbeat of the user based on the analyzing of the video data, and determining that the at least one frame of the video data corresponds to the previously collected image of the user; the actions further including presenting at least one word through a user interface of the application, receiving audio data of the user speaking the at least one word, the audio data generated by an audio capture component of the user device, and comparing the audio data to a stored voice print associated with the user, wherein providing access to the information through the application is further based on determining that the audio data at least partly corresponds to the stored voice print associated with the user; the actions further including: analyzing the video data to determine a current emotional state of the user, accessing emotional state data indicating at least one previous emotional state of the user during at least one previous attempt to access information through the application, and comparing the current emotional state to the at least one previous emotion state, wherein providing access to the information through the application is further based on determining that the current emotional state at least partly corresponds to the at least one previous emotional state; providing access to the information through the application is further based on one or more of: determining that an eye color of the user in at least one frame of the video data corresponds to previously determined eye color information for the user, determining that a personal identification number (PIN) entered by the user corresponds to a valid PIN for the user, determining that an answer provided by the user in response to a knowledge-based authentication (KBA) question corresponds to a stored answer associated with the user, determining that an identifier of the user device corresponds to a stored device identifier associated with the user, or detecting that the user has entered, through a user interface of the application, a one-time passcode previously communicated to the user; the actions further including determining a score as a sum of weights corresponding to: detecting the heartbeat of the user, and determining that the at least one frame of the video data corresponds to the previously collected image of the user, wherein providing access to the information through the application is further based on determining that the score is at least a threshold score; the threshold score is based at least partly on a risk level of the information to be accessed through the application; or the score is determined as the sum of weights further corresponding to one or more of: determining that an eye color of the user in at least one frame of the video data corresponds to previously determined eye color information for the user, determining that a personal identification number (PIN) entered by the user corresponds to a valid PIN for the user, determining that an answer provided by the user in response to a knowledge-based authentication (KBA) question corresponds to a stored answer associated with the user, determining that an identifier of the user device corresponds to a stored device identifier associated with the user, detecting that the user has entered, through a user interface of the application, a one-time passcode previously communicated to the user, or determining that recorded audio data of the user speaking at least partly corresponds to the stored voice print associated with the user.

These and other implementations can provide one or more of the following technical advantages and/or technical improvements compared to traditional authentication techniques. By employing facial recognition with heartbeat detection to authenticate a user, implementations prevent an unauthorized user from employing a still image of the authorized user to gain access to information through an application. Other authentication methods, such as voice print analysis, may also be added into the analysis to ensure greater security. By employing heartbeat detection alone or in combination with other authentication method(s) to authenticate a user, implementations improve the operation of a computing device configured to control user access to information such as sensitive financial account data. For example, by employing heartbeat detection, facial recognition, and/or other authentication technique(s), implementations authenticate a user more quickly, more accurately, and with less likelihood of failed authentication attempts compared to traditional authentication techniques. Accordingly, implementations use less processing power, active memory, and/or network capacity compared to systems that employ traditional authentication techniques, given that such traditional techniques may consume processing power, memory, and/or network capacity to perform multiple authentication attempts following a failed attempt to authenticate a user. Moreover, by providing authentication techniques that employ a combination of heartbeat detection and facial recognition, implementations provide for user authentication that may not require the user to remember and enter credentials such as a username, password, personal identification number (PIN), and so forth. This may expedite the authentication process, particularly on computing devices (e.g., smartphones, wearable computers, etc.) that may be limited in their display and/or user interface capabilities.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
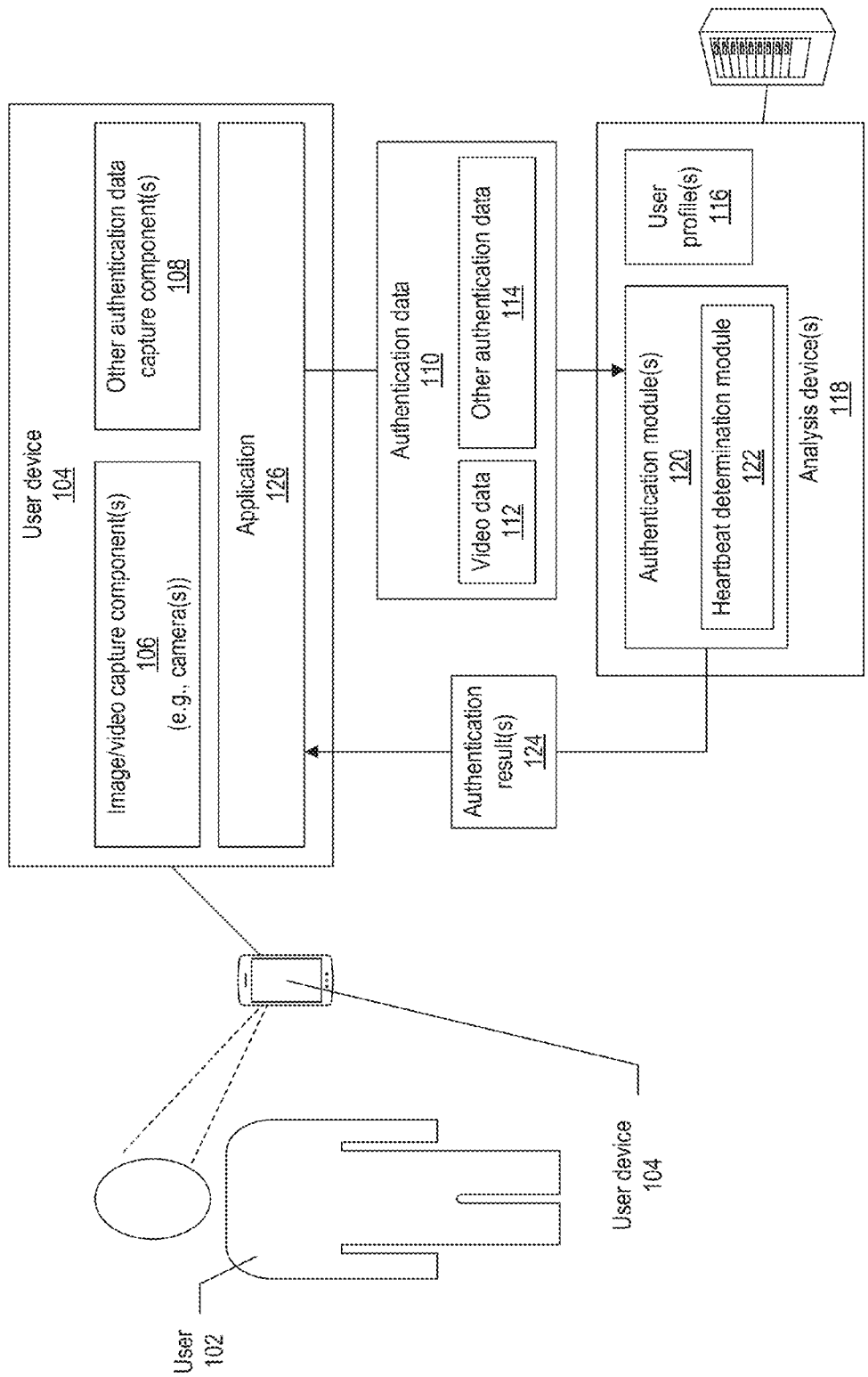
FIG. 1 depicts an example system for authenticating a user based on various types of data, according to implementations of the present disclosure.

Implementations of the present disclosure are directed to systems, devices, methods, and computer-readable media for authenticating a user attempting to access information through an application executing on a user device. Multiple authentication methods may be used in combination to authenticate the user with greater confidence than authentication provided by a single method, and to verify that the user is a live person and not an image or video. In some implementations, facial recognition is used in conjunction with heartbeat detection, via video analysis, to verify the user's identity and confirm that the user is live. Facial recognition may include capturing an image of the user's face and comparing certain points on the face (e.g., location of eyes, mouth, nose, etc.) with previously gathered information regarding the user. Heartbeat detection may include capturing a video segment of the user, stabilizing the captured video data, applying motion magnification techniques to the stabilized video data, and analyzing the stabilized, magnified video data to determine a presence of the user's heartbeat.

In some scenarios, using facial recognition methods to authenticate a user may provide insufficient security. For example, an unauthorized individual may present a still image of the authorized user to a camera of the user device in an attempt to trick an authentication algorithm into determining that the authorized user is using the user device. Accordingly, heartbeat detection may be employed in conjunction with facial recognition to authenticate a user as a live human being, and determine whether the user is to be granted access to information through an application executing on a user device. In some implementations, voice recognition may be added to the heartbeat detection and facial recognition analysis to prevent an unauthorized individual from using recorded video of the authorized user to circumvent both the heartbeat detection and the facial recognition.

Other methods may also be used to provide additional confidence in the authentication of a user. Implementations support the use of any number of authentication techniques, including but not limited to one or more of the following:

Facial recognition, including capturing one or more images of the user's face and comparing the image(s) to previously captured and stored image data associated with the user;

Heartbeat detection through analysis of recorded video of the user, as described herein;

Voice recognition, including prompting the user to repeat (e.g., one or more times) a word or multi-word phrase presented on a user device, recording audio data of the user's speech, and comparing the recorded audio data to a previously stored voice print associated with the user;

Authentication based on a personal identification number (PIN), including receiving a user-entered PIN and comparing the PIN to a previously stored PIN associated with the user;

Knowledge-based authentication (KBA) of the user based on previously set up questions, e.g., "what is your mother's maiden name?", "what is the name of your favorite pet?", and so forth;

Authentication based on a determined emotional state of the user, as described further below;

Authentication based on comparing a detected eye color of the user to previously stored information describing the user's eye color;

Device recognition, including verifying that the device type, operating system, or identifier (e.g., MAC address, manufacturer serial number, etc.) of the user device corresponds to that of a device previously associated with the user; or Single sign-on authentication, in which the user is sent a one-time code or password to use to gain access.

In some implementations, a score is determined for the user based on the successful authentication of the user through multiple authentication methods. Different methods may be assigned different weights in determining the score. For example, facial recognition may be weighted 10 points, heartbeat detection may be weighted 10 points, emotional state determination may be weighted 2 points, eye color comparison may be weighted 5 points, and device recognition may be weighted 5 points. The user may be allowed access if the score exceeds a threshold. In some examples, a higher threshold may be applied if the user is requesting access to more sensitive or high-risk information, compared to a lower threshold applied for access to less sensitive or low-risk information. For example, basic (e.g., read-only) access to account information or publicly available information may require a score of a particular threshold, but a higher threshold may be required to perform sensitive operations such as balance transfers, changing the user's address or contact information, opening accounts, closing accounts, and so forth. In some implementations, the thresholds employed to determine access based on the score may vary based on context. For example, a high asset user (e.g., a user with high balance in an account) may be authenticated with a higher threshold than other users. The user may also have the option to adjust thresholds based on their preferences. In some implementations, higher thresholds may be applied if potential fraud conditions are detected, such as if the user is attempting access from an unusual device, internet protocol (IP) address, or geographic location.

The data collected during voice recognition, heartbeat detection, emotional state determination, voice recognition, or other methods may be stored and used to refine an identity model of the user over time. For example, image data of the user's face may be collected and used in the aggregate to develop a more accurate composite image of the user over time. Similarly, voice print data, emotional state data, or other types of data may be collected and used to develop a more accurate voice print or emotional profile of the user over time. In some implementations, the weights used for developing the score based on different methods may change over time with increasing confidence in the measurement. For example, PIN-based authentication may be assigned a constant weight, but facial recognition may increase in weight over time as more facial image data is collected and analyzed for the user. As another example, authentication based on the emotional state of the user may increase in weight over time as more information is collected regarding a typical emotional state of the user when attempting access to the application.

Emotional state determination may be employed to authenticate the user in conjunction with other methods. The image or video data captured and used for facial recognition or heartbeat detection may also be analyzed to detect mouth shape (e.g., frowning), eyes downcast, or other points of the face, indicating happiness, sadness, anger, stress, duress, or other emotions. Over time, a histogram may be built describing how many times the user was in a particular emotional state when the user was authenticated through the application. During a subsequent attempt to access information through the application, the user's emotional state may be determined and may be compared to the histogram to determine whether the user's emotional state is typical or atypical for the user. If the user's emotional state is their typical state, access may be allowed. If the user's emotional state is atypical, access may be denied, or further authentication may be requested. In some examples, at least a certain number (e.g., 10) of measurements of the user's emotional state may be collected and stored before the system begins to use emotional state determination for authentication. Voice analysis may also be used to gauge the user's emotional state.

Subsequent deviations from the user's emotional pattern may be identified and used to detect if the user is in an unusual emotional state. If so, the system may apply additional authentication methods to authenticate the user. In some implementations, the system may perform other actions based on the user's emotional state. For example, if the user is determined to be under stress which may indicate duress, the system may provide a PIN-based authentication to give the user an opportunity to indicate (e.g., through reverse entry of PIN) if they are being threatened by someone off camera, such as at an automated teller machine (ATM). If the user is under stress, a notification may be sent to customer support or marketing indicating the user needs assistance. For example, if the user is stressed each time when making a mortgage payment through the application, customer support may be notified to contact the user regarding refinancing or other assistance. In this way, the system may develop a model or profile of the user to enable the financial service provider or other application provider to better understand the user and provide better service. The system may periodically re-baseline the user's emotional state to adjust for changes over time in the user's emotional state.

In some implementations, particular authentication methods are used or not used based on context. For example, if a user is above a certain age and thus may have shaky hands, video capture for heartbeat recognition may be less reliable and therefore not used to authenticate the user. If it is known that the user cannot speak, voice recognition may be omitted. In some examples, if it is known that the user's device does not have a user-facing camera, the facial recognition and heartbeat detection methods may be omitted. In poor lighting, the facial recognition and heartbeat detection may be omitted.

In some implementations, the authentication information (e.g., facial image(s), video data, heartbeat data, voice data, etc.) may be stored in a blockchain and communicated to a server within the blockchain. Use of a blockchain may control access to the authentication information, and may enable detection of unauthorized access or alteration of the authentication information. Implementations also support the use of other types of data structures to store and communicate the authentication information. In some examples, the capture of the authentication information may be performed such that the user does not have to perform explicit operations to provide the information, providing an easier way for the user to gain access to information through the application.

FIG. 1 depicts an example system for authenticating a user 102 based on various types of data, according to implementations of the present disclosure. In the example of FIG. 1, the user 102 is employing a user device 104 to access information presented through the user interface (UI) of an application 126 executing on the user device 104. In some examples, the application 126 may be provided by a financial services business or other organization, and may include features to enable the user 102 to view information regarding financial accounts, insurance policies, investments, or other information. The application 126 may also include features to enable the user 102 to request certain actions such as funds transfers, payments, insurance claim processing, investment transactions, changes to contact information, and so forth. Implementations also support applications 126 that provide other types of information or support other types of services. The application 126 may be a web application configured to execute in a web browser, or in some other container for the presentation of web content such as a WebView or UIWebView object. The application 126 may also be a native application that is configured to execute in the hardware and/or software environment of the user device 104.

The user device 104 may be any type of computing device. In some examples, such as the example of FIG. 1, the user device 104 is a mobile or portable computing device such as a smartphone, tablet computer, wearable computer, automotive computer, portable gaming device, notepad, personal data assistant (PDA), and so forth. The user device 104 may also be a less portable computing device, such as a desktop computer, smart appliance, Internet of Things (IoT) device, gaming console, and so forth. The user device 104 may be owned, operated by, or otherwise particularly associated with the user 102. The user device 104 may also be a computing device that is used or shared by various users. For example, the user device 104 may be an ATM, information kiosk, or other computing device accessible to at least a portion of the public.

The user device 104 may include one or more image/video capture components 106, such as one or more cameras configured to capture still images, video, or both images and video of the user 102. The image/video capture component(s) 106 may generate video data 112. The video data 112 may include video of any length and in any format. The video data 112 may also include any number of images of any size and in any format. The user device 104 may also include one or more other authentication data capture components 108 configured to generate other authentication data 114 regarding the user 102. For example, the other authentication data capture component(s) 108 may include one or more of: a microphone to record audio data; a fingerprint reader to capture fingerprint data from the user's finger(s), or component(s) to receive PIN, KBA answer(s), single-use passcode(s), or other authentication information provided by the user. The image/video capture component(s) 106 and other authentication data capture component(s) 108 may include hardware component(s), software component(s), or both hardware and software component(s). For example, the image/video capture component(s) 106 may include camera hardware such as lenses, focusing mechanisms, shutter mechanisms, light detectors, and so forth, as well as software for image stabilization, movement correction, digital image generation, and so forth.

In response to detecting the user's attempt to access information through the application 126, such as at the start of a user session interacting with the application 126, the application 126 may send signals to instruct the image/video capture component(s) 106 and/or the other authentication data capture component(s) 108 to generate authentication data 110 associated with the user 102, such as the video data 112 and/or the other authentication data 114. The authentication data 110 may be communicated over one or more networks (not shown) to one or more analysis devices 118. The analysis device(s) 118 may include server computer(s), distributed computing device(s) (e.g., cloud computing device(s)), network computer(s), or any other type of computing device. The analysis device(s) 118 may execute one or more authentication modules 120 that analyze the authentication data 110 to determine whether to allow the user 102 to access information through the application 126. Based on the analysis, the authentication module(s) 120 may send one or more authentication results 124 over the network(s) to the application 126. The authentication result(s) 124 may instruct the application 126 to allow the user 102 to access information through the application 126 or block the user's access.

In some implementations, the authentication module(s) 120 include a heartbeat determination module 122 that analyzes the video data 112 to measure or otherwise determine the presence (or absence) of a heartbeat in the video data 112. The absence of a heartbeat may indicate that the video data 112 includes still images of the user 102, presented to the user device 104 in an attempt to spoof the user's identity. Accordingly, the absence of a detected heartbeat may lead to a denial of access, or limited access to less sensitive, low-risk information via the application 126.

In some implementations, the authentication module(s) 120 make an authentication determination by comparing the authentication data 110 to a user profile 116 of the user 102 stored on the analysis device(s) 118 or elsewhere. The user profile 116 may include information such as previously collected image(s) of the user's face, voice print data for the user 102, the user's PIN, KBA answer(s) of the user 102, previously generated emotional state data for the user 102, or other information associated with the user 102. The information in the user profile 116 may have been previously provided by the user 102 during a registration process. For example, the user 102 may initial register through a UI of the application 126, and during the initial registration the user 102 may provide biometric information such as a typical heartbeat pattern, typical emotional state, voice patterns, face image(s), eye color information, or other data. The user profile(s) 116 may include profile data for any number of users 102. Although the example of FIG. 1 depicts the user profile(s) 116 stored on the analysis device(s) 118, in some implementations the user profile(s) 116 may be stored on other device(s) in data storage that is accessible to the authentication module(s) 120 over one or more networks. FIGS. 2-9 describe the various operations that may be performed by the authentication module(s) 120 or other software module(s) to authenticate the user 102 and determine whether to enable the user's access to information via the application 126.

Figure 2:
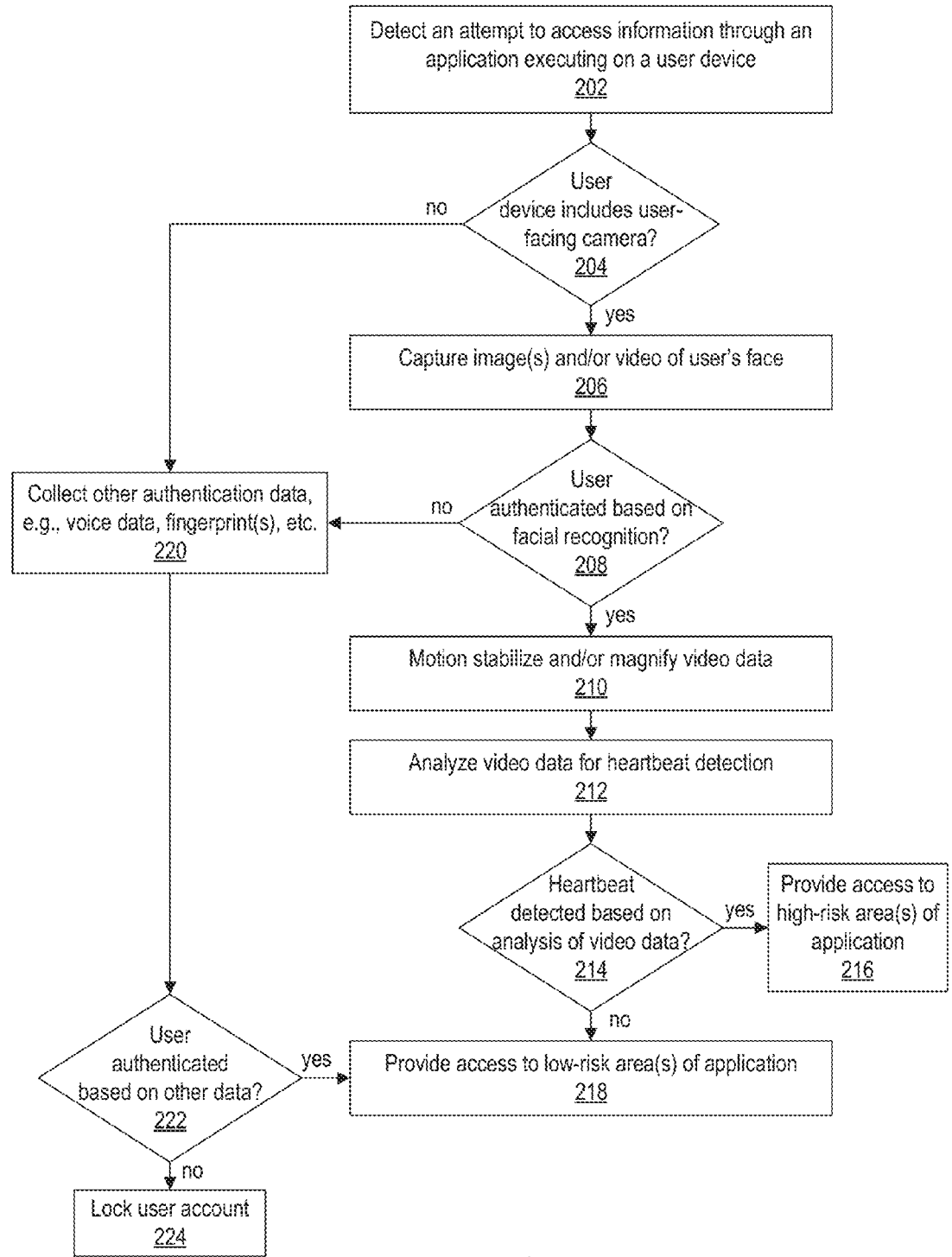
FIG. 2 depicts a flow diagram of an example process for authenticating a user based on various types of data, according to implementations of the present disclosure.

FIG. 2 depicts a flow diagram of an example process for authenticating a user based on various types of data, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

The user 102 may attempt to access information through an application 126 executing on a user device 104. Such an attempt may be a request to login to the application 126, a launch of the application 126 on the user device 104, or a navigation from one portion (e.g., page) of the application 126 to another portion. The attempted access may be detected (202).

A determination may be made (204) whether the user device 104 includes a user-facing camera or other image/video capture component(s) 106 arranged to capture image(s) or video of the user's face. If not, the process may proceed to 220. If so, the process may proceed to 206.

The application 126 may instruct the camera, or other image/video capture component(s) 106, to capture (206) image(s) and/or video of the user's face. The image(s) and/or video may be included in video data 112 for analysis. As described above, in some implementations the video data 112 may be communicated to the analysis device(s) 118 for analysis. In some examples, the video data 112 may be analyzed, at least in part, on the user device 104.

A determination may be made (208) whether the user 102 is authenticated based on facial recognition. Such a determination may be based on comparing one or more images in the video data 112, such as frame(s) of video, to previously captured and stored images of the user's face included in a user profile 116 of the user 102. If the current image(s) are sufficiently similar to the previously captured image(s) of the user 102, the user 102 may be authenticated and the process may proceed to 208. If not, the process may proceed to 220.

In some implementations, one or more operations may be performed to motion stabilize and/or magnify (210) the video data 112. Such operations are described further with reference to FIGS. 3-5. The video data 112, or the motion stabilized and/or magnified video data 112, may be analyzed (212) for heartbeat detection. Such analysis is described further with reference to FIG. 6.

A determination may be made (214) whether a heartbeat has been detected based on the analysis of the video data 112. If a heartbeat is detected, access may be provided (216) to high-risk areas of the application 126 to enable the user 102 to access sensitive information or request high-risk operations (e.g., funds transfers) via the application 126.

If a heartbeat is not detected, access may be provided (218) to low-risk areas of the application 126.

If the user device 104 does not include a user-facing camera, or if user authentication based on facial recognition is not successful, other authentication data 114 may be collected (220). In some implementations, other authentication data 114 may include audio data including recorded speech of the user 102, which may be employed for voice recognition authentication of the user 102 as described above. The other authentication data 114 may also include fingerprint data, a PIN, KBA answer(s), or other information provided by the user 102 and/or collected by the user device 104.

A determination may be made (222) whether the user 102 is authenticated based on the other authentication data 114. In some implementations, the other authentication data 114 may be communicated to the analysis device(s) 118 and compared to data in the user profile 116 to determine whether the user 102 is authenticated. In some implementations, the other authentication data 114 may be analyzed, at least in part, on the user device 104. If the user 102 is authenticated based on the other authentication data 114, the user 102 may be provided (218) access to the low-risk area(s) of the application 126. If the user 102 is not authenticated, the user account may be locked (224) or the user 102 may otherwise be denied access to information via the application 126. In some examples, the user 102 may be instructed to contact a customer service department of the business or other organization that provided the application 126, and request access or provide updated authentication information to enable access.

In some implementations, access to high-risk portion(s) of the application 126 may be granted based on successful authentication of the user 102 via facial recognition, heartbeat detection, and voice print analysis. In some implementations, access to high-risk portion(s) of the application 126 may be granted based on successful authentication of the user 102 via facial recognition and at least one of heartbeat detection or voice print analysis. Accordingly, one or both of the heartbeat detection determination or voice print analysis may be employed to determine whether the user 102 is live and present at the user device 104 during the attempted access, and may prevent access by malicious individuals who may hold an image of the authorized user 102 in front of a camera on the user device 104 to attempt unauthorized access.

Figure 3:
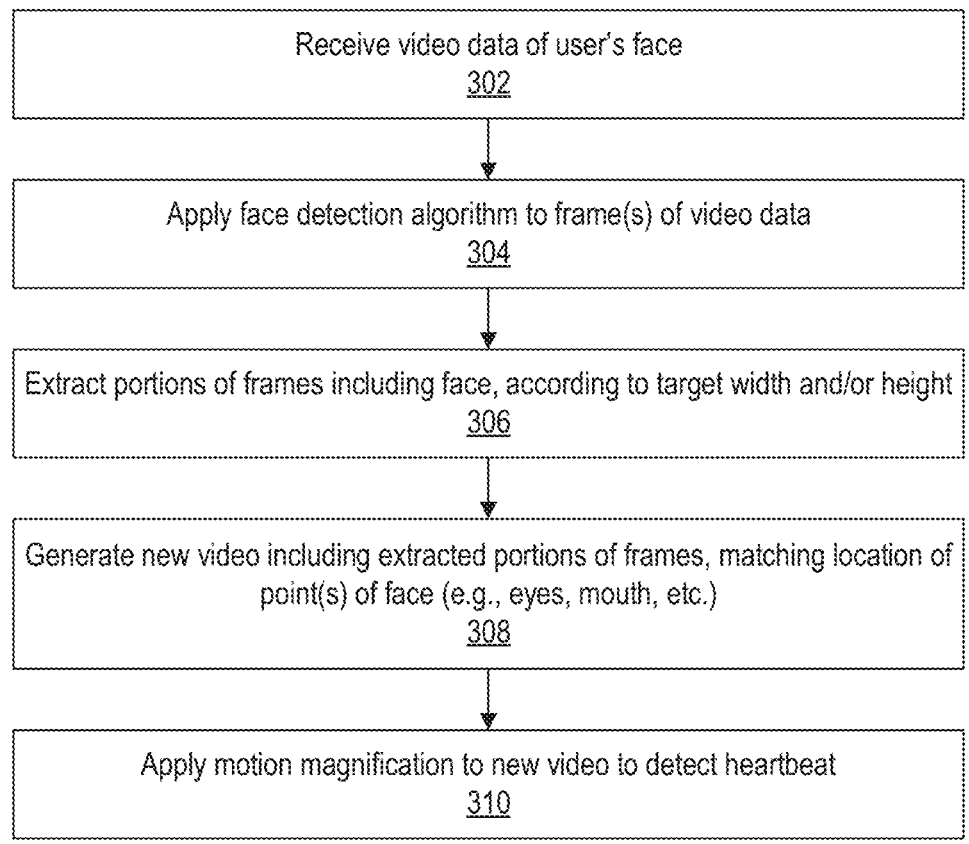
FIG. 3 depicts a flow diagram of an example process for stabilizing and magnifying video data for heartbeat detection, according to implementations of the present disclosure.

FIG. 3 depicts a flow diagram of an example process for stabilizing and magnifying video data for heartbeat detection, according to implementations of the present disclosure. Operations of the process may be performed by one or more of: the application 126; the authentication module(s) 120; the heartbeat determination module 122; or other modules executing on the user device 104, the analysis device(s) 118, or elsewhere. In some implementations, the process of FIG. 3 may be applied to frames of video data 112 that have been stored, as a non-dynamic process after the generation of the video data 112.

Video data 112 of the user's face may be received (302). In some implementations, a face detection algorithm may be applied (304) to one or more frames of the video data 112. A portion of each of the analyzed frames may be extracted (306), the portion(s) including the face of the user 102. In some implementations, the extraction may be according to a target width and/or target height for the extracted portion(s).

A new video may be generated (308) that includes the extracted portion(s) of the analyzed frame(s). In some implementations, the new video may be composed of the frame portion(s) by matching the location of certain points to align the frame(s). For example, the frame(s) may be aligned according to reference points of the user's eye(s), mouth, and so forth. The alignment of frame(s) based on reference points may stabilize the original video data 112. A motion magnification technique may be applied (310) to the new video. Implementations support the use of any motion magnification technique to enhance or identify motion aspects of the video data 112.

Figure 4:
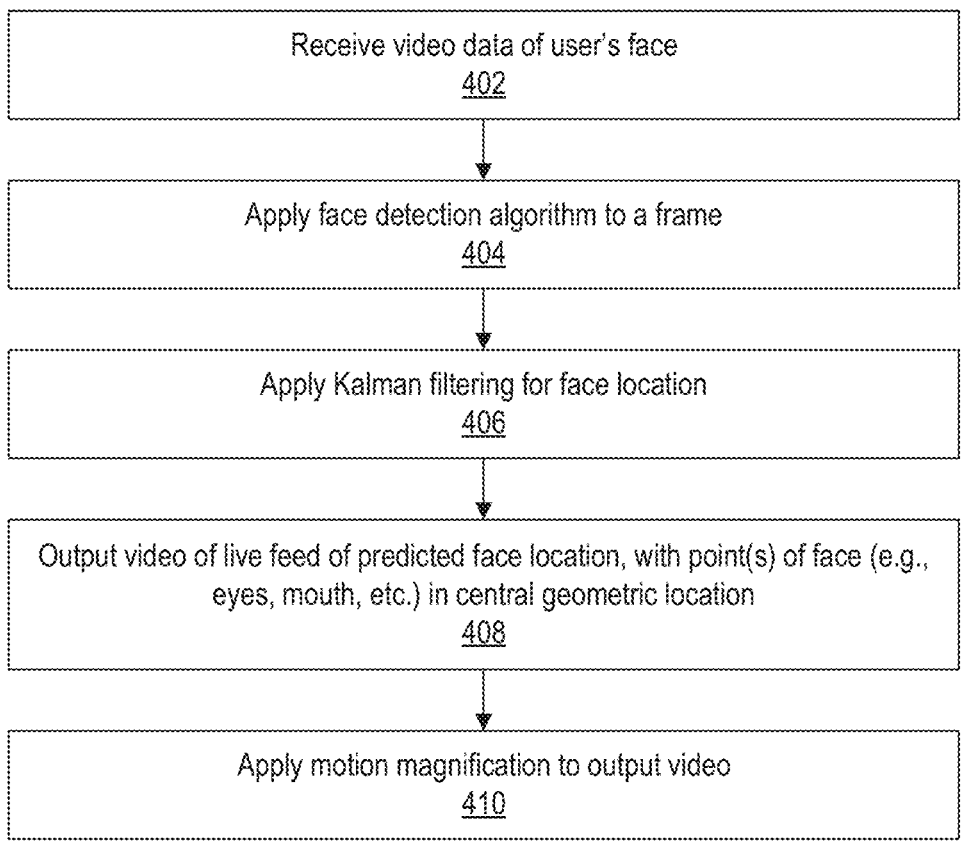
FIG. 4 depicts a flow diagram of an example process for stabilizing and magnifying video data for heartbeat detection, according to implementations of the present disclosure.

FIG. 4 depicts a flow diagram of an example process for stabilizing and magnifying video data for heartbeat detection, according to implementations of the present disclosure. Operations of the process may be performed by one or more of: the application 126; the authentication module(s) 120; the heartbeat determination module 122; or other modules executing on the user device 104, the analysis device(s) 118, or elsewhere. In some implementations, the process of FIG. 4 may be dynamically applied to live video data 112 in real time as it is generated.

Video data 112 of the user's face may be received (402). In some implementations, a face detection algorithm may be applied (404) to one or more frames of the video data 112. In some implementations, Kalman filtering or some other filtering algorithm may be applied (406) to determine a location of the face in the frame(s). The filtering may output (408) live video data according to the predicted face location, with the frames aligned such that one or more points of the face are in a central geometric location within the frame(s). A motion magnification technique may be applied (410) to the stabilized output video.

Figure 5:
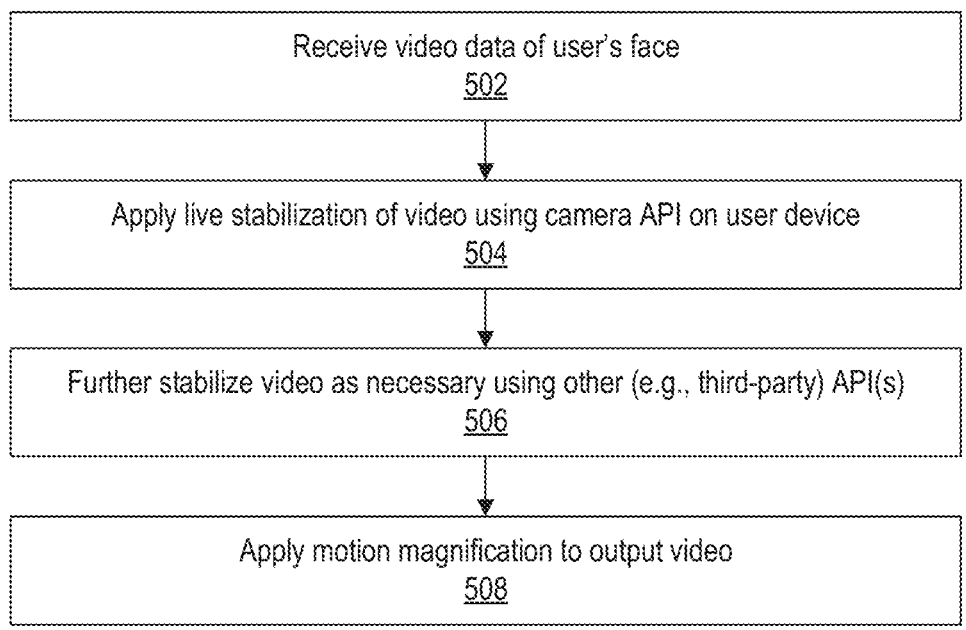
FIG. 5 depicts a flow diagram of an example process for stabilizing and magnifying video data for heartbeat detection, according to implementations of the present disclosure.

FIG. 5 depicts a flow diagram of an example process for stabilizing and magnifying video data for heartbeat detection, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

Video data 112 of the user's face may be received (502). In some implementations, live stabilization is applied (504) to the video data 112 using software executing on the user device 104, such as logic included in a camera API executing on the user device 104. In some implementations, the video data 112 may be further stabilized (506) using other software executing on the user device 104 and/or the analysis device(s) 118. Such other software may be included in third-party API(s). A motion magnification technique may be applied (508) to the stabilized video.

In some implementations, object tracking may be employed to stabilize the video data 112 as described with reference to FIGS. 3-5. To perform object tracking, one or more objects may be identified in at least one frame of the video data. Such object(s) may include facial features (e.g., a nose, eye(s), ear(s), chin, lip(s), etc.). Object(s) may also be in-frame features other than facial features. The identified object(s) may be tracked from frame to frame, and the change of the location of the object(s) from frame to frame may be attributed to a movement of the camera, such as an inadvertent movement (e.g., jostling, jiggling, or shaking) of the user device by the user. The various frames of the video data 112 may be adjusted to account for the movement of the object(s). For example, one or more frame(s) may be shifted in the X-direction and/or Y-direction with respect to the plane of the image, so that the object(s) are located in the frames at a location that is more constant from frame to frame than in the original, un-stabilized video data 112.

Figure 6:
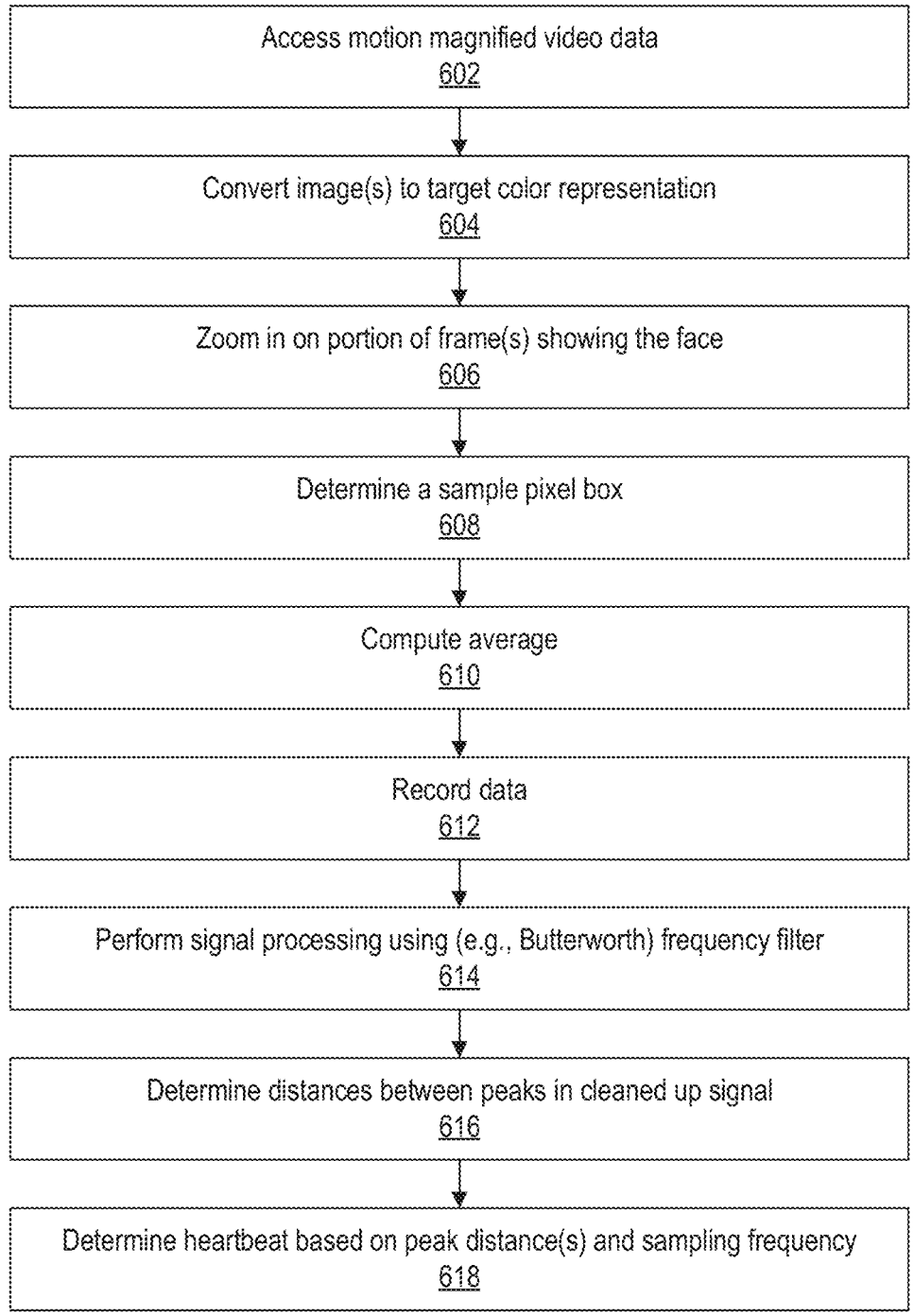
FIG. 6 depicts a flow diagram of an example process for determining the presence of a heartbeat based on analysis of video data, according to implementations of the present disclosure.

FIG. 6 depicts a flow diagram of an example process for determining the presence of a heartbeat based on analysis of video data, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

Motion magnified and/or stabilized video data 112 may be accessed (602). The motion magnified and/or stabilized video data 112 may be generated according to one or more of the processes described above with reference to FIGS. 3-5. In some examples, video stabilization may be performed prior to motion magnification. The stabilization may minimize movement within the video data to enable optimal operation of the motion magnification process, which may work best when the subject of the video (e.g., the face) is still. In some implementations, magnification may be maximized by attempting to stabilize the video of the user 102 so that a user 102 who may be slightly moving may appear still after magnification. Some implementations can apply the motion magnification which amplifies motion and color pigmentation captured in the video. Because the analysis may take into account color pigmentation magnification, implementations may minimize motion as much as possible.

In some implementations, the image(s) (e.g., frame(s)) of the video data 112 may be converted (604) to a target color representation. Each of the frame(s) may be analyzed to zoom in (606) on a portion of the frame(s) that includes the face. In some implementations, a sample pixel box is determined (608). An average may be computed (610). Data may be recorded (612). Signal processing may be performed (614). In some implementations, the signal processing may be performed using a frequency filter such as a Butterworth frequency filter and/or a band-pass filter to clean up the signal in the zoomed video data 112. Distances between peaks in the cleaned up signal may be determined (616). A heartbeat of the user 102 may be determined based on distance(s) between peaks in the signal, taking into account the sampling frequency (e.g., frames per second) of the video data 112.

In some implementations, a portion of the face may be analyzed to detect the heartbeat, instead of analyzing the entire face of the user 102. For example, the portion of the video data 112 that includes the forehead of the user 102 (or some other portion of the face) may be identified based on pattern recognition that recognizes where a forehead is located relative to other facial features (e.g., eyes, nose, etc.). That portion may be excerpted from the video data 112 (e.g., from the frames of the video data 112) and analyzed in an attempt to detect a heartbeat. As another example, a 10-pixel by 10-pixel segment of the face (e.g., from the center of the face) may be analyzed to detect the heartbeat.

Figure 7:
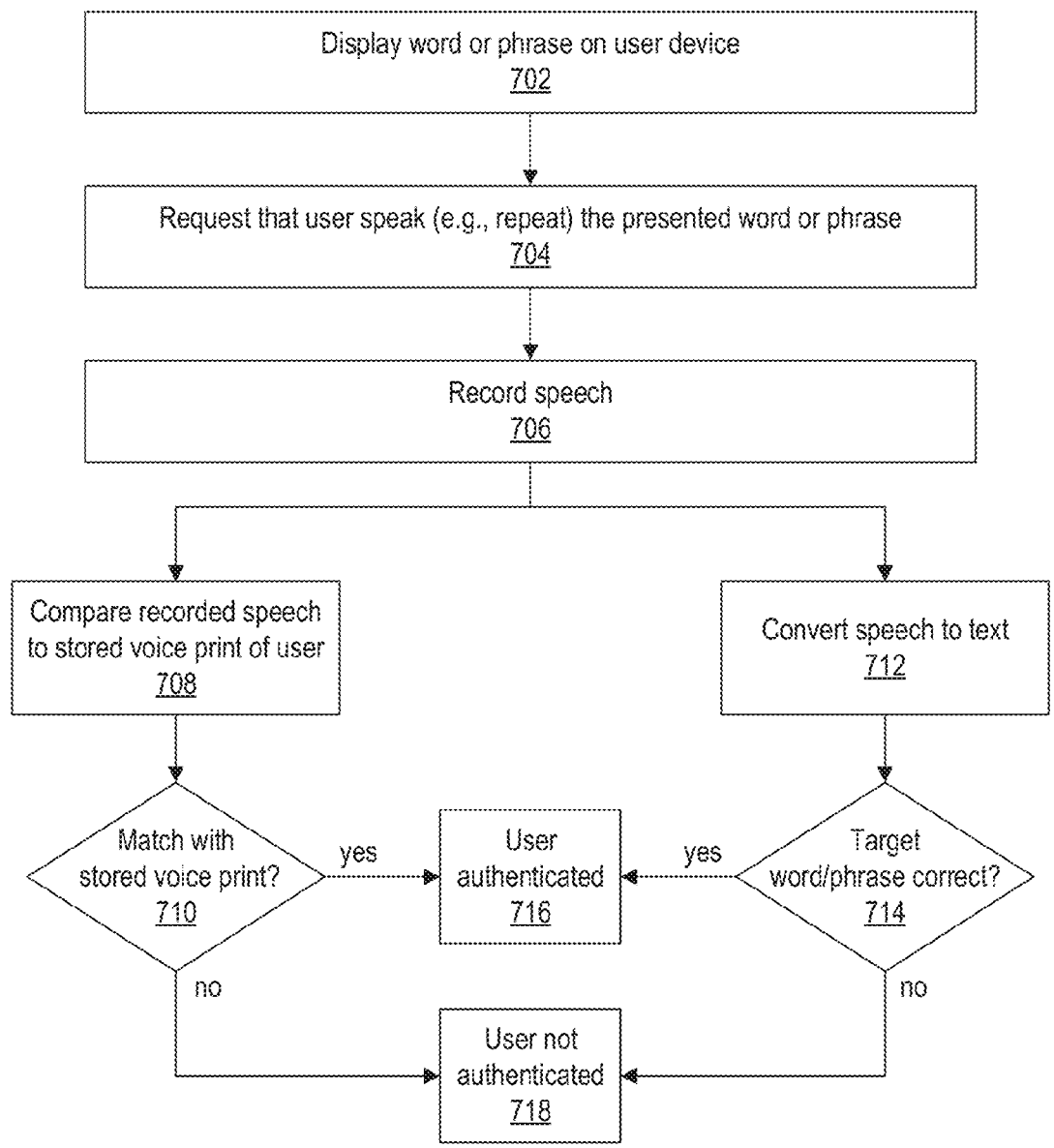
FIG. 7 depicts a flow diagram of an example process for user authentication based on voice data analysis, according to implementations of the present disclosure.

FIG. 7 depicts a flow diagram of an example process for user authentication based on voice data analysis, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

A word, multi-word phrase, or other text data may be displayed (702) on the user device 104, e.g., through the UI of the application 126. The user device 104 may also present a request (704) that the user 102 speak the presented text data. In some examples, the user 102 may be prompted to repeat the presented text data multiple times to ensure that a sufficient amount of voice data is recorded for analysis. The user's speech may be recorded (706).

In some implementations, the recorded speech may be compared (708) to a stored voice print of the user 102, e.g., stored in a user profile 116. Based on the comparison, a determination may be made (710) whether the recorded speech matches or otherwise corresponds to the stored voice print data of the user 102.

In some implementations, the recorded speech may also be converted (712) to text using a speech-to-text (STT) engine. The converted text may be compared to the presented text data to determine (714) whether the user 102 has spoken the presented text data.

If the recorded speech corresponds to the stored voice print, and if the converted text corresponds to the presented text data, a determination may be made that the user 102 is authenticated (716). If the recorded speech does not correspond to the stored voice print, and/or if the converted text does not correspond to the presented text data, a determination may be made that the user 102 is not authenticated (718). In some implementations, the process of FIG. 7 may omit the operations at 712 and 714, and make an authentication determination based on comparing the recorded speech to the previously stored voice print data of the user 102.

Figure 8:
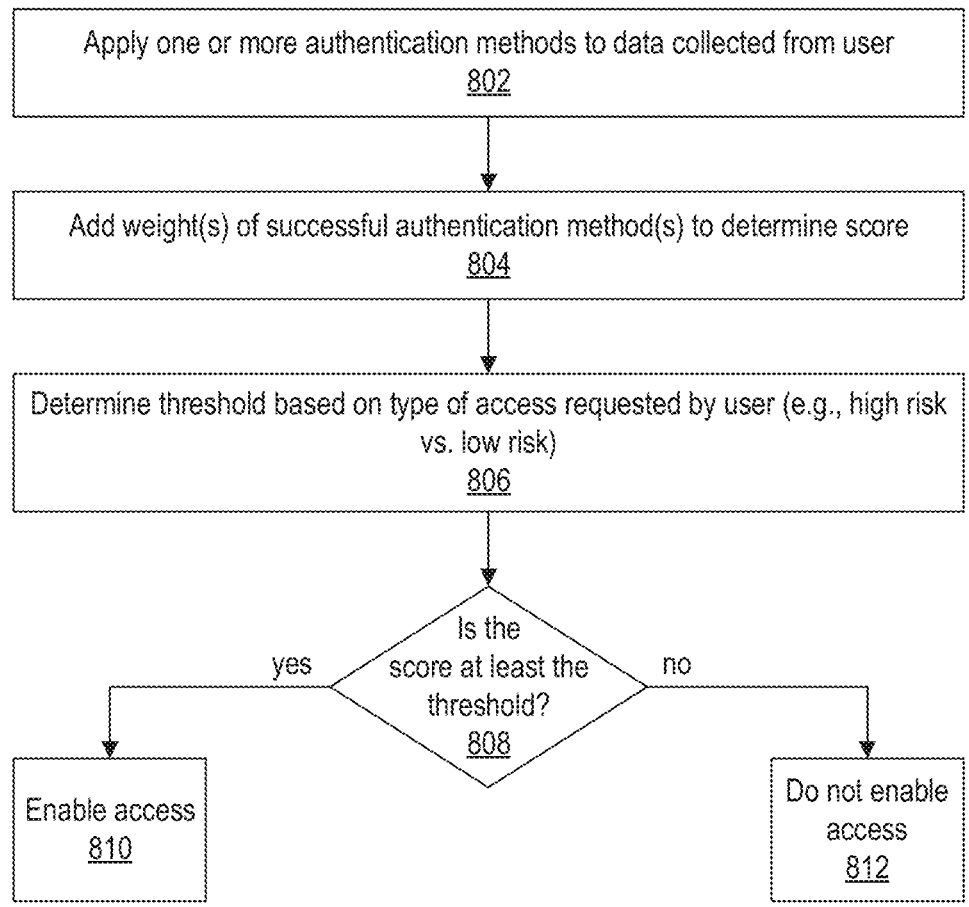
FIG. 8 depicts a flow diagram of an example process for authenticating a user based on a score that includes weights for multiple authentication methods, according to implementations of the present disclosure.

FIG. 8 depicts a flow diagram of an example process for authenticating a user based on a score that includes weights for multiple authentication methods, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

One or more authentication methods may be applied (802) to authentication data 110 collected from the user 102, or collected by the user device 104 based on capturing images, video, and/or voice data of the user 102 as described above. In some implementations, the various authentication methods described herein may each be assigned a weight. For example, more reliable authentication methods may be assigned a higher weight than less reliable or more error-prone methods. The one or more weights of the authentication methods may be added to determine a score (804), for those authentication methods that have been determined to successfully authenticate the user 102.

In some implementations, different access types may be assigned different threshold scores. For example, if the user 102 is attempting to access high-risk (e.g., sensitive) portions of the application 126, a higher threshold may be used. If the user 102 is attempting to access low-risk portions of the application 126, a lower threshold may be used. A threshold score may be determined (806) based on the access type requested, or otherwise attempted, by the user 102.

A determination may be made (808) whether the score is at least the threshold score. If so, the user 102 may be provided access (810) to the requested portions of the application 126. If not, the user 102 may be denied access (812).

Figure 9:
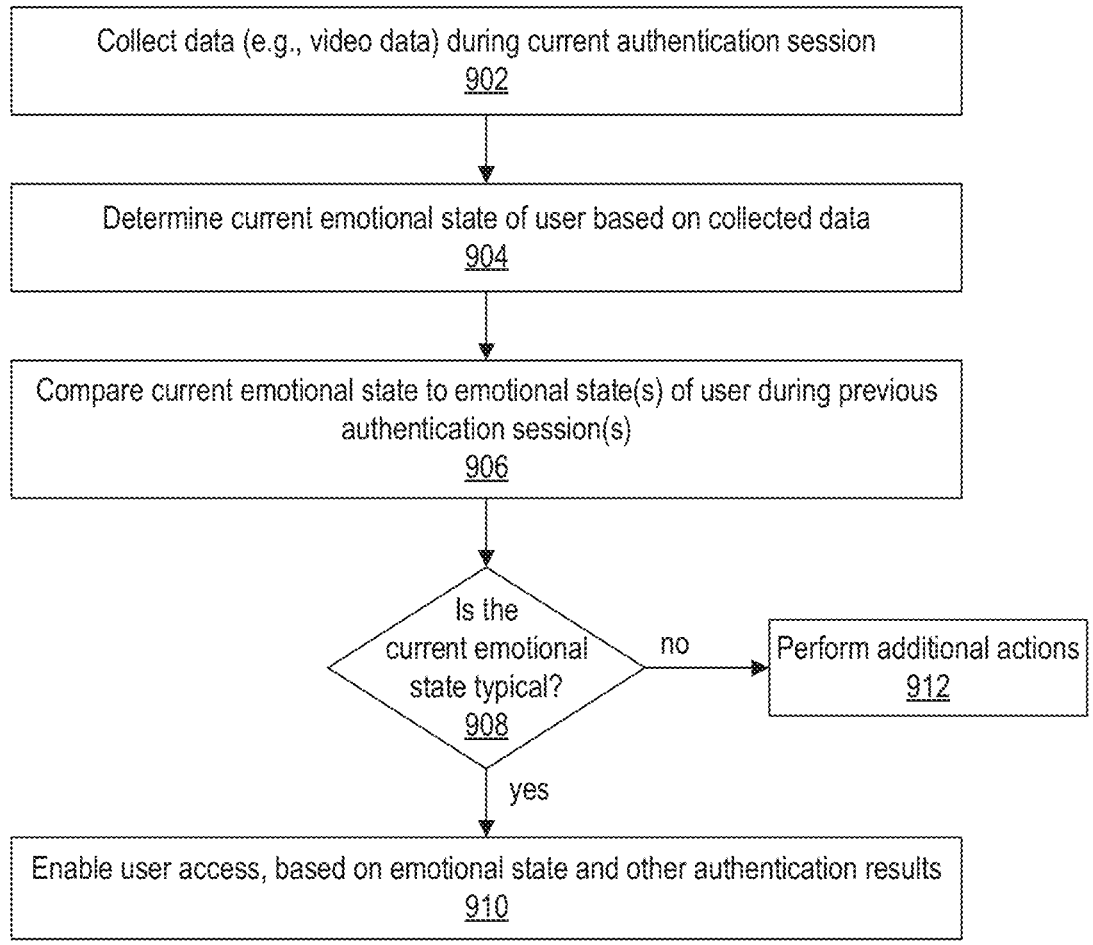
FIG. 9 depicts a flow diagram of an example process for authenticating a user based on a determined emotional state of the user, according to implementations of the present disclosure.

FIG. 9 depicts a flow diagram of an example process for authenticating a user based at least partly on a determined emotional state of the user, according to implementations of the present disclosure. Operations of the process may be performed by one or more of: the application 126; the authentication module(s) 120; the heartbeat determination module 122; or other modules executing on the user device 104, the analysis device(s) 118, or elsewhere.

Data, such as video data 112, voice data, or other authentication data 114 may be collected (902) during a current authentication session to authenticate a user 102 for access to information via an application 126. A current emotional state of the user 102 may be determined (904) based on the collected data as described above. For example, images (e.g., video frames) of the user 102 may be analyzed to determine whether the user 102 is frowning, smiling, laughing, shrugging, has furrowed brows, or is otherwise displaying evidence of an emotional state. Recorded voice data may also be analyzed to detect stress, anger, or other emotions evidenced by the user's voice.

The current emotional state of the user 102 may be compared (906) to previous emotional state data of the user 102, e.g., stored in the user profile 116 of the user 102. The previous emotional state data may have been collected during previous authentication session(s) when the user 102 has attempted access to information through the application 126.

A determination may be made (908) whether the user's current emotional state is typical, e.g., whether it corresponds to previous emotional states demonstrated by the user 102 during authentication. If the current emotional state is typical, the emotional state analysis may be employed, e.g., in combination with other authentication methods described herein, to enable (910) user access to the information on the application 126. If the current emotional state is atypical, that determination may weigh against allowing access. In some implementations, determination of an atypical emotional state of the user 102 may cause additional action(s) to be performed (912). Such additional action(s) may include presenting a PIN-based authentication dialog on the user device 104 to give the user 102 an opportunity to indicate (e.g., through reverse entry of PIN) if they are being threatened by someone off camera, such as at an automated teller machine (ATM). Additional action(s) may also include sending a notification to customer support or marketing indicating the user 102 may need assistance. For example, if the user 102 is stressed each time when making a mortgage payment through the application 126, customer support may be notified to contact the user 102 regarding refinancing or other assistance.

In some implementations, the determined emotional state of the user 102 may also be used to identify possible fraud. For example, if the emotional state of the user 102 indicates that the user 102 is agitated, nervous, and/or stressed in a manner that is atypical for the user 102, a determination may be made that the user 102 is possibly engaged in fraudulent activity. Based on this determination, the system may flag the attempted transaction as possibly fraudulent and/or perform other action(s) to gain greater confidence that the attempted transaction is fraudulent or not fraudulent.

The examples above describe detecting the presence of a user's heartbeat and using the detected presence of the heartbeat in conjunction with one or more other authentication methods to verify the identity of the user and verify that the user is present and alive in front of a video capture device (e.g., camera). In some implementations, the user's heartbeat may itself be used as biometric data for authenticating the user 102, alone or in combination with other authentication methods. A user 102 may have a heartbeat that is distinct enough among a population of users so that the particular heartbeat may be used to identify the user 102 among the population. For example, a user's heartbeat may have a distinctive waveform that includes particular palpitations, peaks, pauses, and/or other features. The heartbeat may be detected through analysis of the video data 112, and the waveform of the heartbeat may be determined through analysis the video data 112. The waveform may then be compared to a previously captured and stored heartbeat waveform of the user 102. A correspondence between the current waveform and the previous waveform may lead to a successful authentication of the user 102. In some implementations, a correspondence between the waveforms may add to the score calculated for the user 102, as described above. In some implementations, a correspondence may be determined between the waveforms if they are statistically similar to one another within a predetermined threshold degree of similarly.

In some implementations, features of the heartbeat waveform such as the presence, duration, height, and/or timing of various peaks and/or pauses in the waveform may be determined and transformed into alphanumeric data, as a hash of the waveform. For example, a representation of the waveform may be divided into tiles, and the presence, absence, or percentage of the waveform data in each tile may be used to determine alphanumeric data for the tile. The data for the various tiles may be combined to determine the hash of the waveform. The hash may be stored and compared to the hash determined from a subsequent measurement of the user's heartbeat. A correspondence, or at least an approximate correspondence, between the previous and current hash may be used to verify the identity of the user 102. In some implementations, such a heartbeat-based signature of the user 102 may be used alone to verify the user's identity. In some implementations, the heartbeat-based signature may be used in combination with other (e.g., biometric) authentication methods, such as voice recognition, fingerprint analysis, retinal scan analysis, emotional state determination, and so forth.

Figure 10:
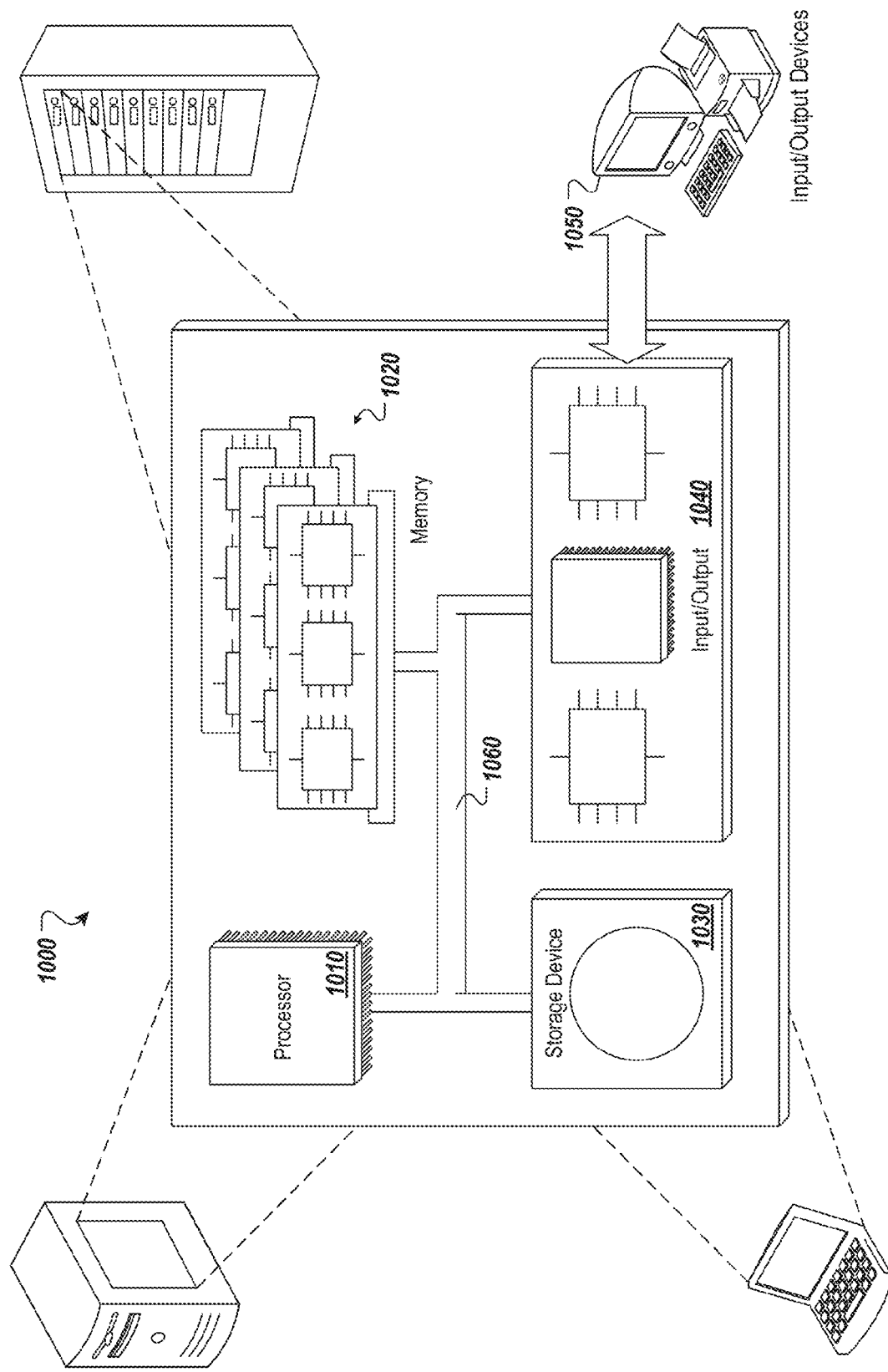
FIG. 10 depicts an example computing system, according to implementations of the present disclosure.

FIG. 10 depicts an example computing system, according to implementations of the present disclosure. The system 1000 may be used for any of the operations described with respect to the various implementations discussed herein. For example, the system 1000 may be included, at least in part, in one or more of the user device 104 or the analysis device(s) 118 described herein. The system 1000 may include one or more processors 1010, a memory 1020, one or more storage devices 1030, and one or more input/output (I/O) devices 1050 controllable via one or more I/O interfaces 1040. Two or more of the components 1010, 1020, 1030, 1040, or 1050 may be interconnected via at least one system bus 1060, which may enable the transfer of data between the various modules and components of the system 1000.

The processor(s) 1010 may be configured to process instructions for execution within the system 1000. The processor(s) 1010 may include single-threaded processor(s), multi-threaded processor(s), or both. The processor(s) 1010 may be configured to process instructions stored in the memory 1020 or on the storage device(s) 1030. The processor(s) 1010 may include hardware-based processor(s) each including one or more cores. The processor(s) 1010 may include general purpose processor(s), special purpose processor(s), or both.

The memory 1020 may store information within the system 1000. In some implementations, the memory 1020 includes one or more computer-readable media. The memory 1020 may include any number of volatile memory units, any number of non-volatile memory units, or both volatile and non-volatile memory units. The memory 1020 may include read-only memory, random access memory, or both. In some examples, the memory 1020 may be employed as active or physical memory by one or more executing software modules.

The storage device(s) 1030 may be configured to provide (e.g., persistent) mass storage for the system 1000. In some implementations, the storage device(s) 1030 may include one or more computer-readable media. For example, the storage device(s) 1030 may include a floppy disk device, a hard disk device, an optical disk device, or a tape device. The storage device(s) 1030 may include read-only memory, random access memory, or both. The storage device(s) 1030 may include one or more of an internal hard drive, an external hard drive, or a removable drive.

One or both of the memory 1020 or the storage device(s) 1030 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1000. In some implementations, the CRSM may include a data store that provides storage of computer-readable instructions or other information in a non-transitory format. The CRSM may be incorporated into the system 1000 or may be external with respect to the system 1000. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1010 and the memory 1020 may be supplemented by, or incorporated into, one or more application-specific integrated circuits (ASICs).

The system 1000 may include one or more I/O devices 1050. The I/O device(s) 1050 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1050 may also include one or more output devices such as a display, LED(s), an audio output device (e.g., a speaker), a printer, a haptic output device, and so forth. The I/O device(s) 1050 may be physically incorporated in one or more computing devices of the system 1000, or may be external with respect to one or more computing devices of the system 1000.

The system 1000 may include one or more I/O interfaces 1040 to enable components or modules of the system 1000 to control, interface with, or otherwise communicate with the I/O device(s) 1050. The I/O interface(s) 1040 may enable information to be transferred in or out of the system 1000, or between components of the system 1000, through serial communication, parallel communication, or other types of communication. For example, the I/O interface(s) 1040 may comply with a version of the RS-232 standard for serial ports, or with a version of the IEEE 1284 standard for parallel ports. As another example, the I/O interface(s) 1040 may be configured to provide a connection over Universal Serial Bus (USB) or Ethernet. In some examples, the I/O interface(s) 1040 may be configured to provide a serial connection that is compliant with a version of the IEEE 1394 standard.

The I/O interface(s) 1040 may also include one or more network interfaces that enable communications between computing devices in the system 1000, or between the system 1000 and other network-connected computing systems. The network interface(s) may include one or more network interface controllers (NICs) or other types of transceiver devices configured to send and receive communications over one or more networks using any network protocol.

Computing devices of the system 1000 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1000 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, video data of a user, the video data collected in response to detecting an attempt to access information through an application executing on a user device, the video data generated by a video capture component of a user device;
   comparing, by the at least one processor, at least one frame of the video data to a previously collected image of the user;
   analyzing, by the at least one processor, the video data to detect a heartbeat of the user;
   providing, by the at least one processor, access to high-risk information through the application based at least partly on:
      detecting the heartbeat of the user based on the analyzing of the video data; and
      determining that the at least one frame of the video data corresponds to the previously collected image of the user; and
   providing, by the at least one processor, access to low-risk information through the application based at least partly on:
      failing to detect the heartbeat of the user based on the analyzing of the video data; and
      determining that the at least one frame of the video data corresponds to the previously collected image of the user.

2. The method of claim 1, wherein analyzing the video data to detect the heartbeat further comprises:
   performing motion stabilization on the video data; and
   magnifying the video data.

3. The method of claim 1, further comprising:
   presenting, by the at least one processor, at least one word through a user interface of the application;
   receiving, by the at least one processor, audio data of the user speaking the at least one word, the audio data generated by an audio capture component of the user device; and
   comparing, by the at least one processor, the audio data to a stored voice print associated with the user;
   wherein providing access to the information through the application is further based on determining that the audio data at least partly corresponds to the stored voice print associated with the user.

4. The method of claim 1, further comprising:
   analyzing, by the at least one processor, the video data to determine a current emotional state of the user;
   accessing, by the at least one processor, emotional state data indicating at least one previous emotional state of the user during at least one previous attempt to access information through the application; and
   comparing, by the at least one processor, the current emotional state to the at least one previous emotion state;
   wherein providing access to the information through the application is further based on determining that the current emotional state at least partly corresponds to the at least one previous emotional state.

5. The method of claim 1, wherein providing access to the information through the application is further based on one or more of:
   determining that an eye color of the user in at least one frame of the video data corresponds to previously determined eye color information for the user;
   determining that a personal identification number (PIN) entered by the user corresponds to a valid PIN for the user;
   determining that an answer provided by the user in response to a knowledge-based authentication (KBA) question corresponds to a stored answer associated with the user;
   determining that an identifier of the user device corresponds to a stored device identifier associated with the user; or
   detecting that the user has entered, through a user interface of the application, a one-time passcode previously communicated to the user.

6. The method of claim 1, further comprising:
   determining, by the at least one processor, a score as a sum of weights corresponding to:
      detecting the heartbeat of the user; and
      determining that the at least one frame of the video data corresponds to the previously collected image of the user;
   wherein providing access to the information through the application is further based on determining that the score is at least a threshold score.

7. The method of claim 6, wherein the threshold score is based at least partly on a risk level of the information to be accessed through the application.

8. The method of claim 6, wherein the score is determined as the sum of weights further corresponding to one or more of:

determining that an eye color of the user in at least one frame of the video data corresponds to previously determined eye color information for the user;
determining that a personal identification number (PIN) entered by the user corresponds to a valid PIN for the user;
determining that an answer provided by the user in response to a knowledge-based authentication (KBA) question corresponds to a stored answer associated with the user;
determining that an identifier of the user device corresponds to a stored device identifier associated with the user;
detecting that the user has entered, through a user interface of the application, a one-time passcode previously communicated to the user; or
determining that recorded audio data of the user speaking at least partly corresponds to the stored voice print associated with the user.

9. A system comprising:
at least one processor; and
a memory communicatively coupled to the at least one processor, the memory storing instructions which, when executed, cause the at least one processor to perform operations comprising:
receiving video data of a user, the video data collected in response to detecting an attempt to access information through an application executing on a user device, the video data generated by a video capture component of a user device;
comparing at least one frame of the video data to a previously collected image of the user;
analyzing the video data to detect a heartbeat of the user;
providing access to high-risk information through the application based at least partly on:
detecting the heartbeat of the user based on the analyzing of the video data; and
determining that the at least one frame of the video data corresponds to the previously collected image of the user; and
providing access to low-risk information through the application based at least partly on:
failing to detect the heartbeat of the user based on the analyzing of the video data; and
determining that the at least one frame of the video data corresponds to the previously collected image of the user.

10. The system of claim 9, wherein analyzing the video data to detect the heartbeat further comprises:
performing motion stabilization on the video data; and
magnifying the video data.

11. The system of claim 9, the operations further comprising:
presenting at least one word through a user interface of the application;
receiving audio data of the user speaking the at least one word, the audio data generated by an audio capture component of the user device; and
comparing the audio data to a stored voice print associated with the user;
wherein providing access to the information through the application is further based on determining that the audio data at least partly corresponds to the stored voice print associated with the user.

12. The system of claim 9, the operations further comprising:
analyzing the video data to determine a current emotional state of the user;
accessing emotional state data indicating at least one previous emotional state of the user during at least one previous attempt to access information through the application; and
comparing the current emotional state to the at least one previous emotion state;
wherein providing access to the information through the application is further based on determining that the current emotional state at least partly corresponds to the at least one previous emotional state.

13. The system of claim 9, the operations further comprising:
determining a score as a sum of weights corresponding to:
detecting the heartbeat of the user; and
determining that the at least one frame of the video data corresponds to the previously collected image of the user;
wherein providing access to the information through the application is further based on determining that the score is at least a threshold score.

14. One or more non-transitory computer-readable storage media storing instructions which, when executed, cause at least one processor to perform operations comprising:
receiving video data of a user, the video data collected in response to detecting an attempt to access information through an application executing on a user device, the video data generated by a video capture component of a user device;
comparing at least one frame of the video data to a previously collected image of the user;
analyzing the video data to detect a heartbeat of the user;
providing access to high-risk information through the application based at least partly on:
detecting the heartbeat of the user based on the analyzing of the video data; and
determining that the at least one frame of the video data corresponds to the previously collected image of the user; and
providing access to low-risk information through the application based at least partly on:
failing to detect the heartbeat of the user based on the analyzing of the video data; and
determining that the at least one frame of the video data corresponds to the previously collected image of the user.

15. The one or more non-transitory computer-readable storage media of claim 14, wherein analyzing the video data to detect the heartbeat further comprises:
performing motion stabilization on the video data; and
magnifying the video data.

16. The one or more non-transitory computer-readable storage media of claim 14, the operations further comprising:
presenting at least one word through a user interface of the application;
receiving audio data of the user speaking the at least one word, the audio data generated by an audio capture component of the user device; and
comparing the audio data to a stored voice print associated with the user;
wherein providing access to the information through the application is further based on determining that the audio data at least partly corresponds to the stored voice print associated with the user.

17. The one or more non-transitory computer-readable storage media of claim 14, the operations further comprising:
- analyzing the video data to determine a current emotional state of the user;
- accessing emotional state data indicating at least one previous emotional state of the user during at least one previous attempt to access information through the application; and
- comparing the current emotional state to the at least one previous emotion state;
- wherein providing access to the information through the application is further based on determining that the current emotional state at least partly corresponds to the at least one previous emotional state.

* * * * *